United States Patent [19]
Crockett et al.

[11] Patent Number: 6,131,749
[45] Date of Patent: Oct. 17, 2000

[54] ADJUSTABLE CLOTHES RACK

[76] Inventors: Stanley B. Crockett; Betty J. Crockett, both of 307 Weightman Rd., Mound City, Mo. 64470

[21] Appl. No.: 09/250,217

[22] Filed: Feb. 15, 1999

[51] Int. Cl.$^7$ ................. A47F 5/13; A47H 1/08
[52] U.S. Cl. ............ 211/195; 211/105.3; 211/172; 248/165
[58] Field of Search .................. 211/195, 198, 211/172, 182, 206, 105.1, 105.3, 171; 248/166, 165, 172, 173, 163.2, 440; 403/109.1, 109.6, 335, 93

[56] References Cited

U.S. PATENT DOCUMENTS

| | | | |
|---|---|---|---|
| 1,202,660 | 10/1916 | Breault | 248/166 |
| 1,342,236 | 6/1920 | Szako | 248/166 |
| 1,719,440 | 7/1929 | Nathan | 248/166 |
| 2,599,513 | 6/1952 | Griffin | 211/172 |
| 2,651,487 | 9/1953 | Loock et al. | 248/166 |
| 2,744,712 | 5/1956 | Brandt | 248/166 |
| 2,927,719 | 3/1960 | Wareham | 248/166 |
| 2,995,847 | 8/1961 | Carpenter | 248/166 |
| 3,527,434 | 9/1970 | Mauro | 248/166 |
| 3,765,630 | 10/1973 | Woolley | 248/166 |
| 3,798,814 | 3/1974 | Harmon | 248/166 |
| 4,502,563 | 3/1985 | Pershon | 248/166 |
| 4,790,529 | 12/1988 | Pelle | 248/166 |
| 4,807,766 | 2/1989 | Compagnucci | 248/166 |
| 5,102,079 | 4/1992 | Lee | 248/167 |
| 5,556,064 | 9/1996 | Cowe | 248/166 |
| 5,613,658 | 3/1997 | Rogelja | 248/166 |
| 5,836,552 | 11/1998 | Yu | 248/166 |
| 5,924,660 | 7/1999 | Marron | 248/166 |

*Primary Examiner*—Daniel P. Stodola
*Assistant Examiner*—Jennifer E. Novosad
*Attorney, Agent, or Firm*—Dale J. Ream

[57] ABSTRACT

An adjustable clothes rack for a vehicle including a length-adjustable support rod having a first sleeve and a second sleeve telescopically received in the first sleeve and movable along the rod axis for adjusting the length of the rod. A pair of leg assemblies are coupled to opposed ends of the support rod. The leg assemblies include length-adjustable legs for supporting the rod a selected distance above a support surface. The legs of each leg assembly can be individually rotated about the rod axis so that the legs define a selected angle with respect to each other for providing an adjustable width dimension for the rack. Each leg assembly can also be rotated about an axis normal to the rod axis for selective movement of a leg assembly between a functional configuration and storage configuration.

9 Claims, 7 Drawing Sheets

ADJUSTABLE CLOTHES RACK

BACKGROUND OF THE INVENTION

This invention relates generally to clothes racks and, more particularly, to a clothes rack for a vehicle having length, width, and height dimensions that are adjustable.

Most vehicles include at least one garment hook for hanging a garment during travel. These garment hooks are typically mounted above the rear side windows and are capable of holding only a few garments. Several devices have been proposed in the prior art for holding additional garments in a vehicle or for holding garments without impeding vision through the rear windows. The proposed devices, however, do not span the entire width of a vehicle for accommodating multiple garments without impeding vision through vehicle windows.

Thus, it is desirable to have a vehicle clothes rack having length, width, and height dimensions that are adjustable to fit within vehicles of various sizes and configurations. A vehicle clothes rack is also desired which can carry multiple garments. It is further desirable to have a vehicle clothes rack that can be easily collapsed for storage.

SUMMARY OF THE INVENTION

A clothes rack for a vehicle constructed in accordance with the present invention includes a length-adjustable support rod that is supported a user-selectable distance above a support surface by a pair of oppositely disposed leg assemblies. Each leg assembly includes a pair of length-adjustable legs for providing an adjustable height dimension. The support rod includes a plurality of telescopic sleeves that are movable along a rod axis for adjusting the length of the rod. Each leg of the leg assemblies also includes telescopic sleeves for adjusting the length of the leg assemblies and therefore the height dimension of the rack. The leg assemblies are coupled to opposed ends of the support rod.

The legs of each leg assembly can be individually rotated about the rod axis so that the legs define a selected angle with respect to each other for providing an adjustable width dimension for the rack. Each leg assembly can also be rotated about an axis normal to the rod axis for selective movement of a leg assembly between a functional configuration and storage configuration.

It is therefore a general object of this invention to provide a clothes rack that is adjustable for carrying clothing within many different vehicle types.

Another object of this invention is to provide a clothes rack, as aforesaid, the length of which can be selectively adjusted.

Still another object of this invention is to provide a clothes rack, as aforesaid, the height of which can be selectively adjusted.

Yet another object of this invention is to provide a clothes rack, as aforesaid, the width of which can be selectively adjusted.

A further object of this invention is to provide a clothes rack, as aforesaid, which can be easily moved between functional and storage configurations.

A still further object of this invention is to provide a clothes rack, as aforesaid, which is securely maintained in a selected functional or storage configuration.

Still another object of this invention is to provide a clothes rack, as aforesaid, which can be securely maintained in a selected length, height, and width configuration.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
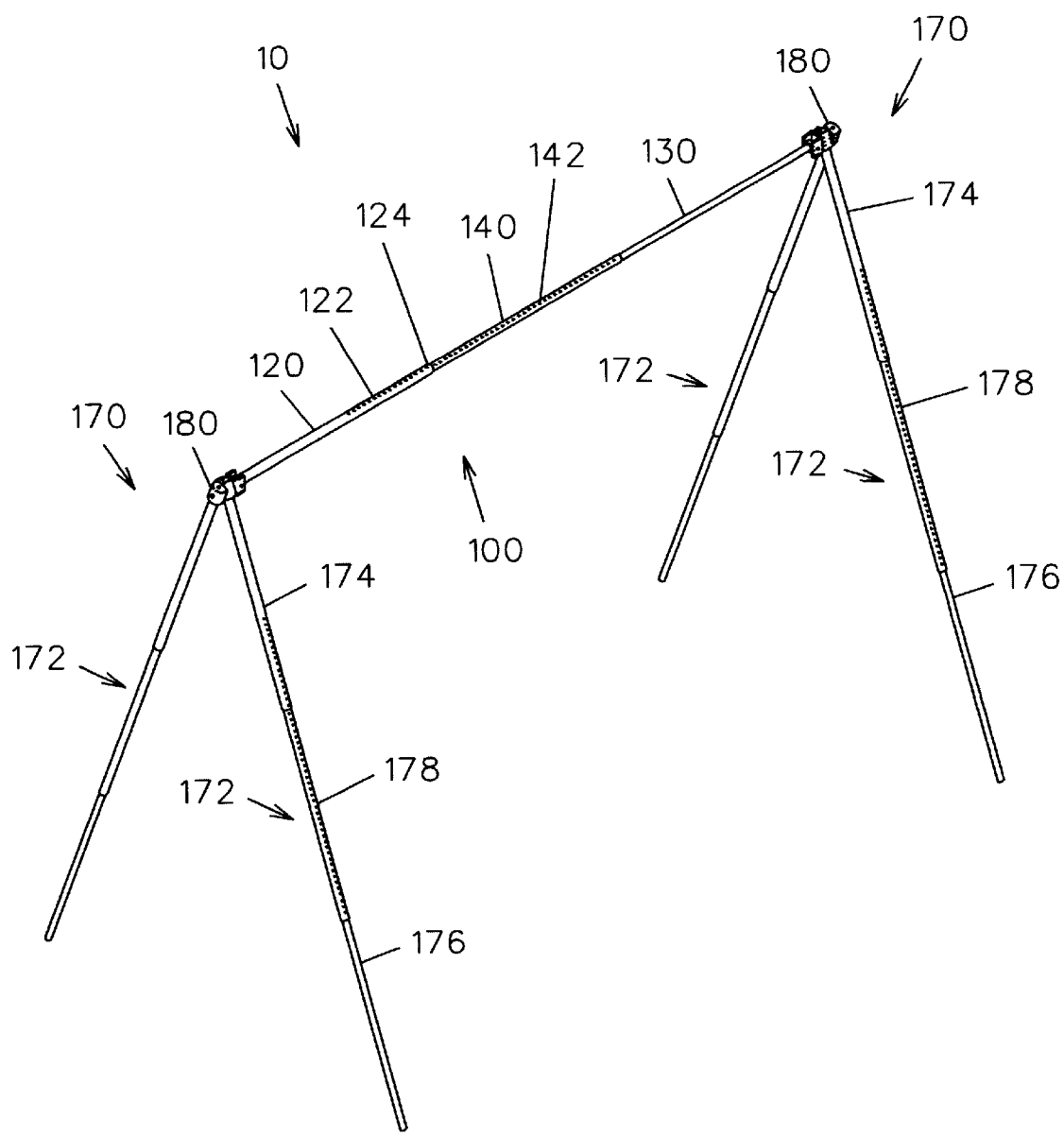
FIG. 1 is a perspective view of the adjustable clothes rack constructed in accordance with a preferred embodiment of the present invention with the legs in a fully extended configuration.
Figure 2:
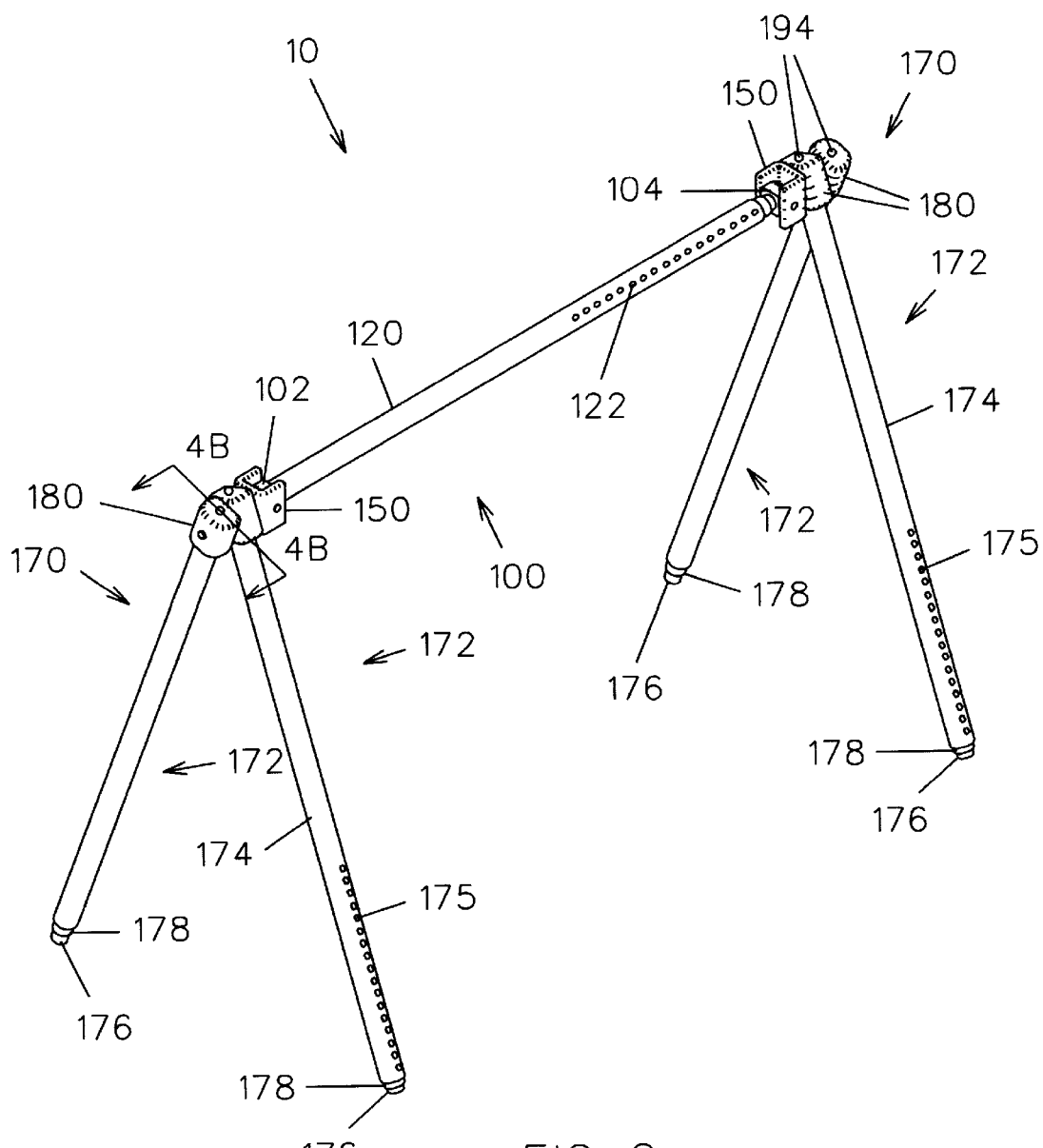
FIG. 2 is a perspective view of the rack with the legs in a fully retracted configuration.

The preferred embodiment of an adjustable clothes rack 10 for a vehicle according to the present invention is shown in FIGS. 1 and 2 and includes a telescopic length-adjustable support rod 100 that defines a longitudinal rod axis. The support rod 100 includes first 120 and second 130 sleeves fixedly attached to first 102 and second 104 ends, respectively. Each end 102, 104 defines a first aperture 106 having a square configuration and a second aperture 108 having a circular configuration with a cylindrical bore 110 extending therebetween. The bore 110 defines an axis normal to the longitudinal rod axis. The support rod 100 further includes a third sleeve 140 intermedia te the first 120 and second 130 sleeves. The second sleeve 130 is telescopically received in the intermediate sl eeve 140 which, in turn, is telescopically received in the first sleeve 120.

Figure 7:
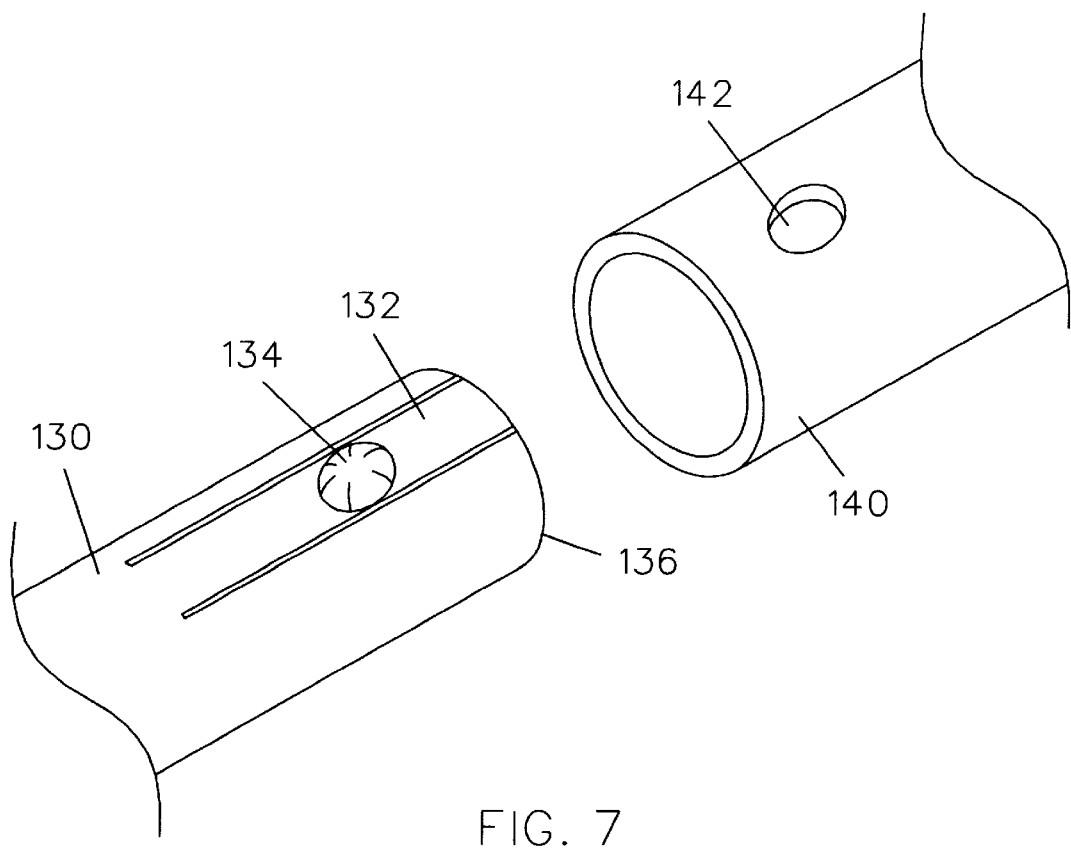
FIG. 7 is a view of a telescopic fastening structure on an enlarged scale.

As best shown in FIGS. 1 and 7, the intermediate sleeve 140 includes a plurality of longitudinally spaced apart apertures 142. The second sleeve 130 includes tab/flange 132 displaced from an interior end 136 thereof, the flange 132 being constructed of a pliable material such as spring steel. The flange 132 includes a generally button-like member 134 such that the flange 132 can be released from engagement with an aperture 142 upon moderate downward pressure by a user to thereby adjust the length of the rack 10. The first sleeve 120 also includes a plurality of longitudinally spaced apart apertures 122 extending from an inwardly disposed end 124 thereof. The intermediate sleeve 140 includes a pliable flange (not shown) adjacent to the inwardly disposed end 124 of the first sleeve 120 for selective adjustment of the intermediate 140 and first 120 sleeves in the manner previously described (FIG. 1). It should be appreciated that the intermediate sleeve 140 can be entirely removed from the support rod 100 by releasing the flanges of the intermediate 140 and second 130 sleeves and slidably removing the intermediate sleeve 140.

Figure 5:
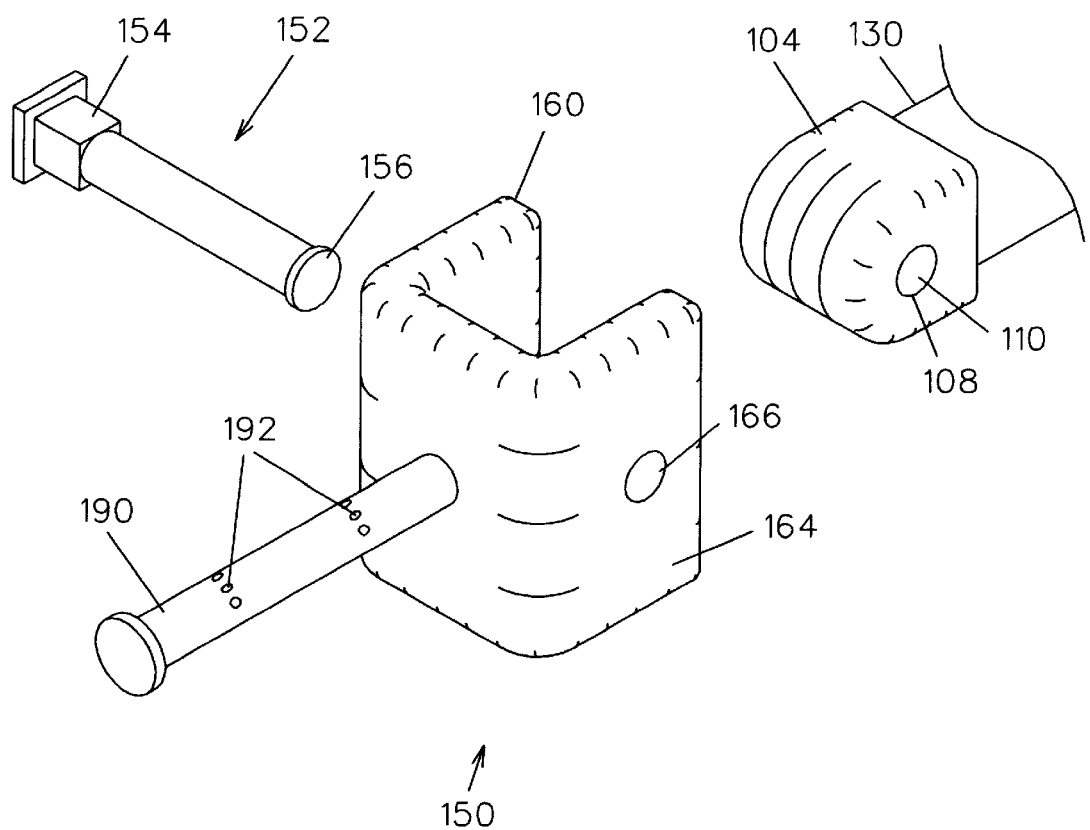
FIG. 5 is an exploded isometric view of a hinge assembly with the leg assemblies removed.
Figure 6:
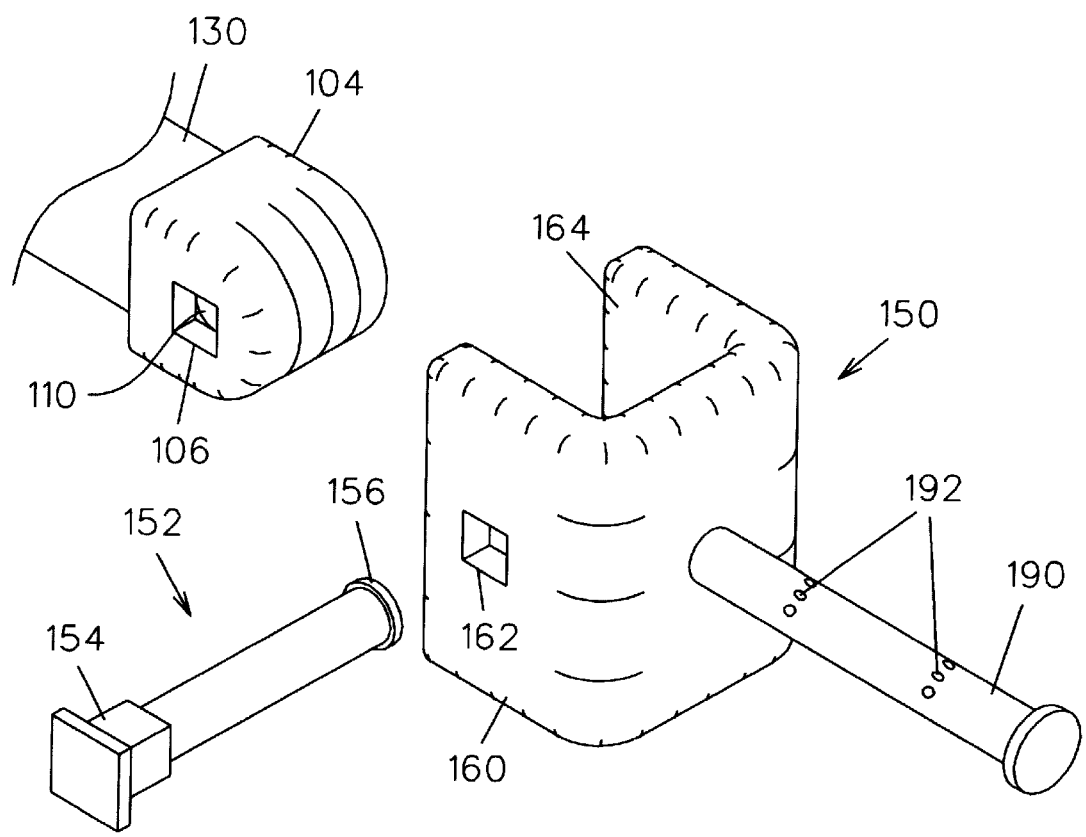
FIG. 6 is a reverse view of the hinge assembly of FIG. 5.

A hinge 150 is pivotally coupled to each of the first 102 and second 104 ends of the support rod 100, respectively, with a fastener 152. As shown in FIGS. 5 and 6, each hinge 150 presents first 160 and second 164 side walls with an open front for receiving an end of the support rod 100. The first side wall 160 defines a square shaped aperture 162 while the second side wall 164 defines a circular aperture 166. The hinge apertures 162, 166 register with the end apertures 162, 106. Preferably, the fastener 152 is a shoulder bolt having a square neck 154 which can user-selectably register with apertures 106 of the ends 102, 104 and with apertures 162 of the hinges 150 to prevent movement of a hinge 150 relative to the rod axis. A circular flange 156 is fixedly attached to the tip of the fastener 152 and extends through the circular aperture 166 in the second side wall 164 of the hinge 150. Upon user pressure against the flange 156, the neck 154 of the fastener 152 is released from registration with apertures 106, 162 to allow a hinge 150 to pivot about end 102 or 104.

The support rod 100 is supported above a support surface, such as the floor of a vehicle or residence, by a pair of leg assemblies 170, each assembly having an identical construction. Each leg assembly 170 includes a pair of length-adjustable legs 172. Each leg 172 presents first 174, second 176, and intermediate 178 sleeves having a construction and function identical to the support rod 100 as previously described. Apertures in the first leg sleeve 174 are indicated by reference number 175 (FIG. 2).

Figure 4A:
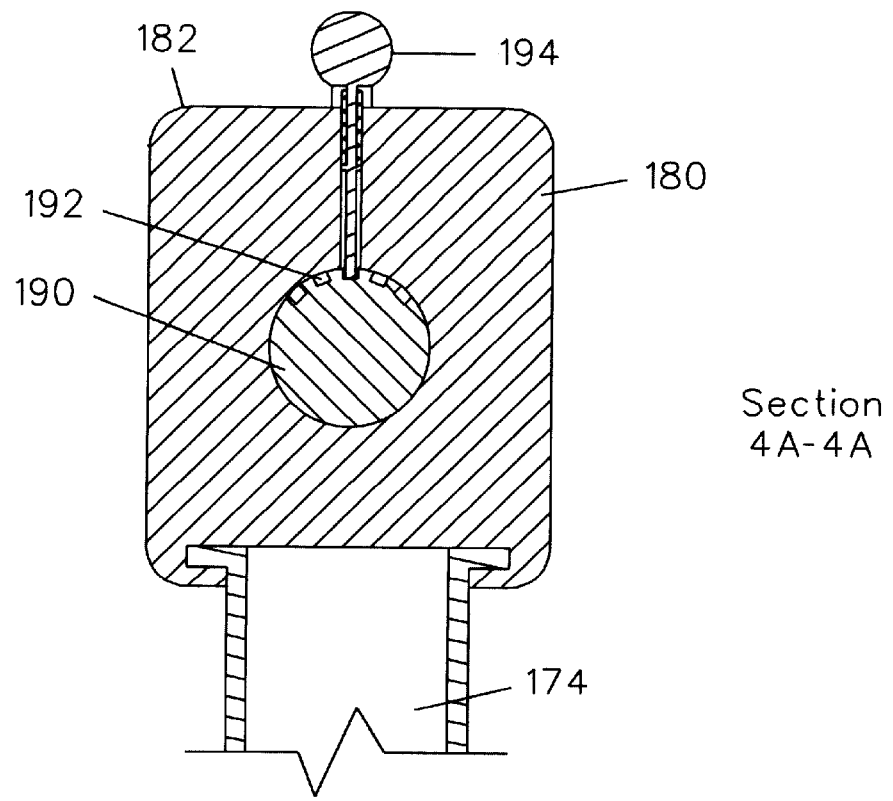
FIG. 4A is a sectional view of a leg coupling taken along line 4A—4A of FIG. 3.
Figure 4B:
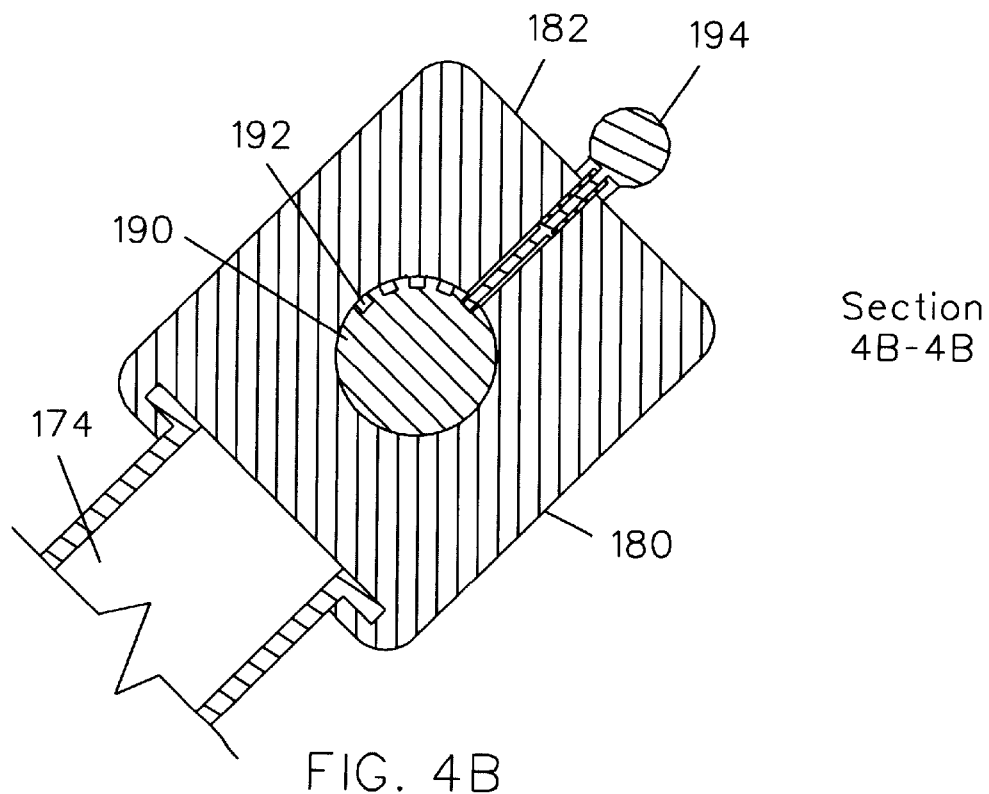
FIG. 4B is a sectional view of a leg coupling taken along line 4B—4B of FIG. 2.

As shown in FIGS. 2, 4A and 4B, the upper end of each first leg sleeve 174 is fixedly attached to a coupling 180. Each coupling 180 is pivotally attached to a leg assembly shaft 190 which extends outwardly from each hinge 150 and defines a shaft axis. Each shaft 190 presents a pair of spaced apart series of apertures 192, each series extending about the shaft periphery. A pin 194 extends through the top surface 182 of each coupling 180 and into a selected shaft aperture 192 for preventing pivotal movement of the coupling 180 about the shaft 190. A user can adjust the angle between the legs 172 of a leg assembly 170 by releasing the pin 194 from the selected aperture 192, pivoting a coupling 180 and leg 172 about the shaft 190 to thereby adjust the angle, and reinserting the pin 194.

In operation, the length, height, and width dimensions of the clothes rack 10 can be adjusted according to the available space within a vehicle or the number of garments to be hung on the support rod 100. The length of the support rod 100 is adjusted by selectively moving first 120, second 130, and intermediate 140 sleeves along the longitudinal axis of the support rod 100 and allowing flanges 132 to be releasably inserted in the sleeve apertures 142 or 122. The height of the clothes rack 10 is adjusted in the same manner, only relative to the sleeves 174, 176, 178 of the legs 172.

The width of the rack 10 is adjusted by adjusting the angle between the legs 172 of a leg assembly 170. The angle between legs 172 of a leg assembly 170 is adjusted by releasing the pin 194 from a shaft aperture 192, pivoting the coupling 180 and leg 172 to the desired angle, and then pin 194 into the appropriate shaft aperture 192 (FIGS. 4A and 4B).

Figure 3A:
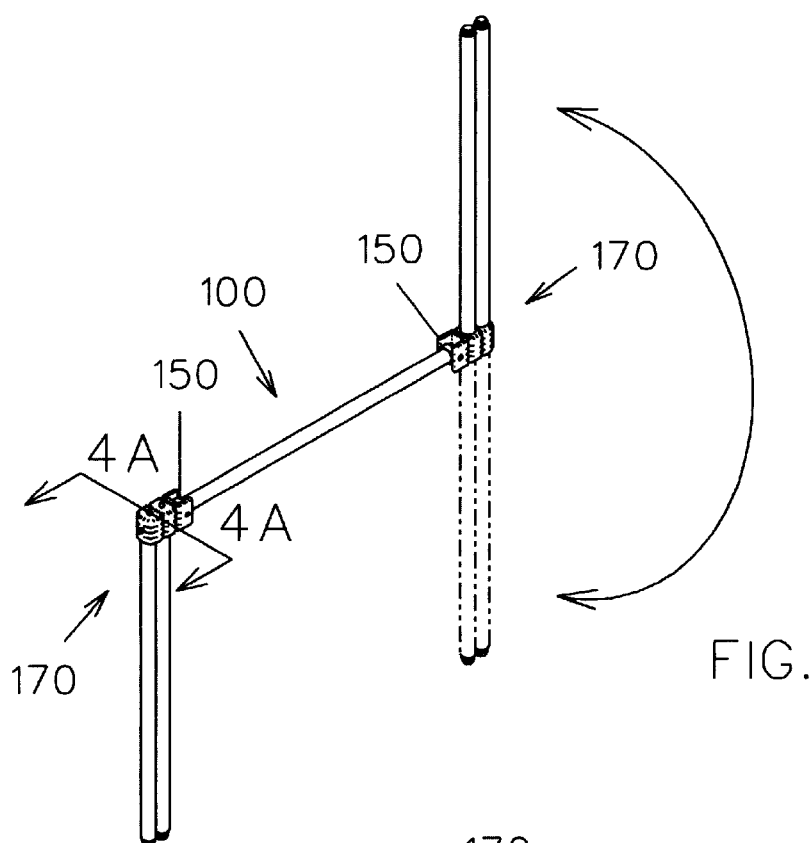
FIGS. 3A–3C are perspective views showing the progressive steps of collapsing the rack into a storage configuration.
Figure 3B:
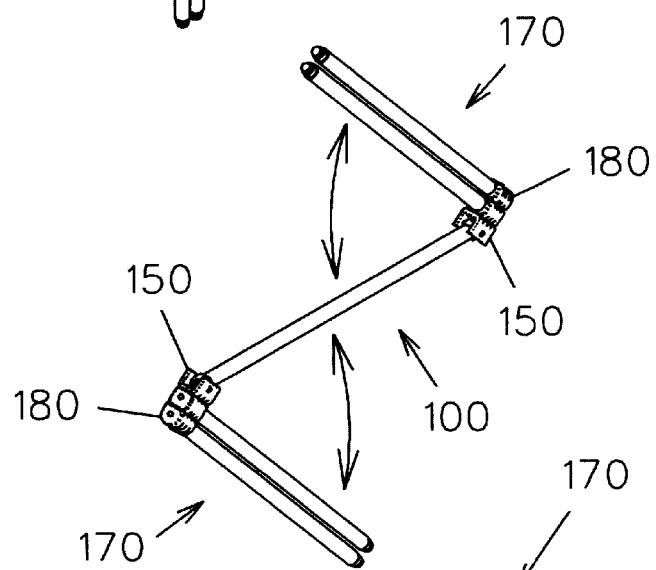
Figure 3C:
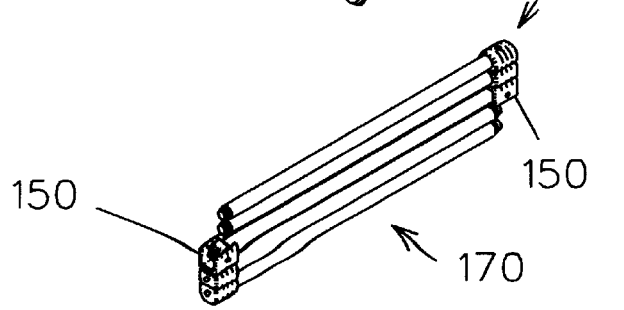

The clothes rack 10 can be collapsed into a storage configuration as shown in FIGS. 3A through 3C. First, the legs 172 of each leg assembly 170 are pivoted by a user to a position adjacent one another by manipulating the pins 194 and couplings 180 as previously described. In the same manner, one leg assembly 170 is inverted to a FIG. 3A position. The fasteners 152 are then released so that each hinge 150 is free pivot about an axis normal to the rod axis (FIG. 3B). When the rack 10 has been entirely collapsed (FIG. 3C), the fasteners 152 can again be moved such that the neck 154 registers with the square end apertures 162 and hinge apertures 162 to prevent movement of the hinges 150. Thus, the rack 10 can be securely stored. It is understood that the rack 10 can again be placed in its functional configuration by reversing these steps.

Accordingly, it can be seen that the length, height, and width of the clothes rack 10 can be adjusted to fit the confines of many types of vehicles. The rack 10 can also be collapsed into a convenient storage configuration when not in use.

It is understood that while certain forms of this invention have been illustrated and described, it is not limited thereto except insofar as such limitations are included in the following claims and allowable functional equivalents thereof.

having thus described the invention, what is claimed as new and desired to be secured by letters patent is as follows:

1. A clothes rack for a vehicle, comprising:
   a length-adjustable support rod defining a longitudinal rod axis and defining opposed first and second ends, the rod including a first rod element having a plurality of apertures therealong and a second rod element telescopically received in the first rod element and movable along the rod axis for adjusting the length of the rod, the second rod element having a flange for selectably engaging one of the apertures;
   a first leg assembly for supporting the first end of the rod above a support surface, the first leg assembly including a pair of length-adjustable legs, each leg having a free end for contacting the support surface;
   first coupling means for coupling the legs to the rod adjacent to the first end of the rod for individual rotation about the rod axis so that the legs of the first leg assembly define a selectable angle with respect to each other and define an adjustable rack width dimension;
   a second leg assembly for supporting the second end of the rod above a support surface, the second leg assembly including a pair of length-adjustable legs, each leg having a free end for contacting the support surface;
   second coupling means for coupling the legs to the rod adjacent to the second end of the rod for individual rotation about the rod axis so that the legs of the second leg assembly define a selectable angle with respect to each other and define an adjustable rack width dimension; a leg assembly shaft coupled to the first end of the support rod and defining a longitudinal shaft axis, the shaft presenting a periphery which defines a plurality of spaced apart apertures; a pair of couplings pivotally attached to the shaft and attached to respective legs of the first leg assembly; a pin extending through each coupling and selectably engageable with one of the shaft apertures for maintaining the selected angle with respect to the legs, and
   wherein the legs of the first leg assembly and the legs of the second leg assembly are adjustable such that the rod is supported parallel to the support surface.

2. A clothes rack as in claim 1 wherein each of the length-adjustable legs of the first leg assembly includes a first leg element and a second leg element telescopically received in the first leg element for adjusting the height of the rack.

3. A clothes rack as in claim 2 wherein each of the length-adjustable legs of the first leg assembly includes a means for holding the second leg element in a user-selectable position relative to the first leg element.

4. A clothing rack as in claim 1 wherein each of the length-adjustable legs of the second leg assembly includes a first leg element and a second leg element, each leg assembly including a means for holding the second leg element in a user-selectable position relative to the first leg element.

5. A clothes rack as in claim 1 wherein the second coupling means comprises:

a second leg assembly shaft coupled to the second end of the support rod and defining a longitudinal shaft axis, the second leg assembly shaft presenting a periphery which defines a plurality of spaced apart apertures;

a pair of couplings pivotally attached to the shaft and attached to respective legs of the second leg assembly; and a pin extending through each coupling and selectably engageable with one of the shaft apertures for maintaining the selected angle with respect to the legs.

6. A collapsible clothes rack for a vehicle, comprising:

a length-adjustable support rod defining a longitudinal rod axis and defining opposed first and second ends, the rod including a first rod element having a plurality of apertures therealong and a second rod element telescopically received in the first rod element and movable along the rod axis for adjusting the length of the rod, the second rod element having a flange for selectably engaging one of the apertures;

a first leg assembly for supporting the first end of the rod a selected distance above a support surface, the first leg assembly including a pair of length-adjustable legs pivotally coupled with the rod for individual rotation about the rod axis;

a first coupling means comprising:

a first leg assembly shaft coupled to the first end of the support rod and defining a longitudinal shaft axis, the first leg assembly shaft presenting a periphery which defines a plurality of spaced apart apertures;

a pair of couplings pivotally attached to the shaft and attached to respective legs of the first leg assembly; and a pin extending through each coupling and selectably engageable with one of the shaft apertures for maintaining the selected angle with respect to the legs;

second coupling means for pivotally coupling the first leg assembly with the first end of the rod for rotation about an axis normal to the rod axis so that the first leg assembly can be moved between a first functional configuration normal to the support rod and a second storage configuration parallel to the support rod;

a second leg assembly for supporting the second end of the rod a selected distance above a support surface, the second leg assembly including a pair of length-adjustable legs pivotally coupled with the rod for individual rotation about the rod axis, each leg having a free end for contacting the support surface; and third coupling means for pivotally coupling the second leg assembly with the second end of the rod for rotation about an axis normal to the rod axis so that the second leg assembly can be moved between a first functional configuration normal to the support rod and a second storage configuration parallel to the support rod, the first and second leg assemblies adapted to be adjacent one another when at the storage configurations, respectively.

7. A clothes rack as in claim 6 wherein the first coupling means includes a means for selectably holding the first leg assembly in the first or second configuration.

8. A clothes rack as in claim 6 wherein the length-adjustable support rod includes a means for holding the second rod element in a user-selectable position relative to the first rod element.

9. A clothes rack as in claim 6 wherein each of the length-adjustable legs of the first leg assembly includes a first leg element and a second leg element and a means for holding the second leg element in a user-selectable position relative to the first leg element.

* * * * *